May 6, 1941.　　　　J. S. MORGAN, JR　　　　2,240,740
TRANSMISSION
Filed Oct. 6, 1939　　　　2 Sheets-Sheet 1

Inventor
John S. Morgan Jr.
By Lyon & Lyon
Attorneys

May 6, 1941.　　　　J. S. MORGAN, JR　　　　2,240,740
TRANSMISSION
Filed Oct. 6, 1939　　　　2 Sheets-Sheet 2

Inventor
John S. Morgan Jr.
By Lyon & Lyon
Attorneys

Patented May 6, 1941

2,240,740

UNITED STATES PATENT OFFICE 2,240,740

TRANSMISSION

John S. Morgan, Jr., Hermosa Beach, Calif., assignor to The National Supply Company, Pittsburgh, Pa., a corporation of Pennsylvania Application October 6, 1939, Serial No. 298,237

13 Claims. (Cl. 74—298)

This invention relates to transmissions and more particularly to a change speed or reversing transmission means particularly applicable for use in connection with in line shafts.

It is an object of my invention to provide a transmission mechanism applicable for coupling driving and driven shafts whereby a multiple speed or reverse drive may be had between aligned driving and driven shafts.

Another object of this invention is to provide a transmission applicable for coupling aligned driving and driven shafts providing for a forward and a reverse drive including transmission gears wherein the reverse drive is through the gear train and wherein the gear train does not carry any portion of the load during the forward drive.

Another object of this invention is to provide a transmission drive of a construction applicable either for multiple change speed drive in one direction or applicable for forward and reverse direction drive wherein a planetary gear train is employed and in which the relative size of the planetary gears in said train is determinative of the direction of drive.

Another object of this invention is to provide a transmission for aligned driving and driven shafts including a gear train and a clutch mechanism therefor wherein the removal of the clutch mechanism may be had without disturbing the said gear train.

Another object of this invention is to provide a transmission for in line shafts wherein the gear mechanism of such transmission is fully enclosed in an oil sealed enclosure isolated from the clutch actuating mechanism.

Another object of this invention is to provide a transmission wherein the gear mechanism thereof is of the spur gear type and which is applicable to provide a reverse drive wherein the use of internal gearing is obviated.

Other objects and advantages of this invention it is believed will be apparent from the following detailed description of a preferred embodiment thereof as illustrated in the accompanying drawings.

Figure 1:
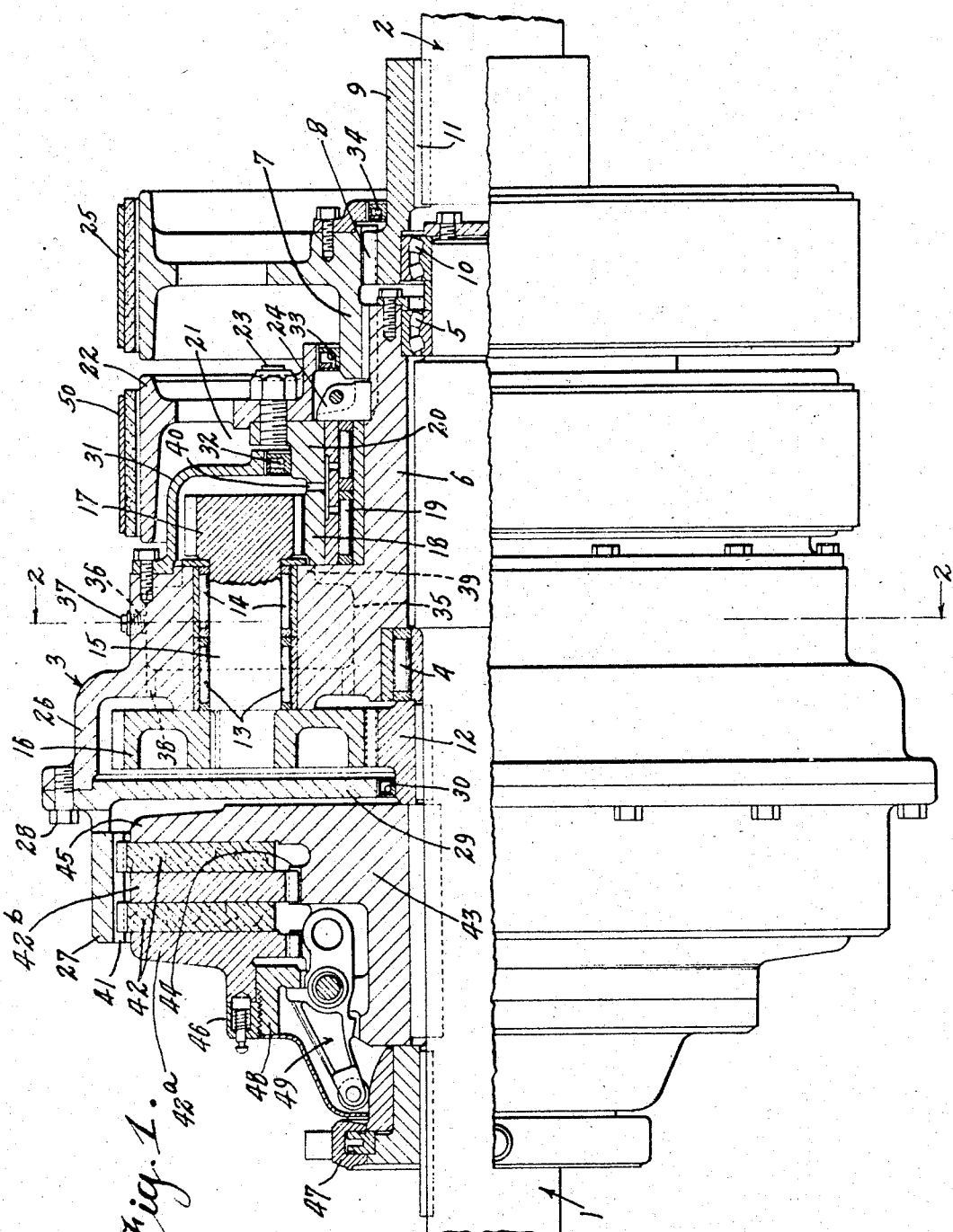
Figure 1 is a side elevation partially in vertical section of the transmission embodied in my invention.
Figure 2:
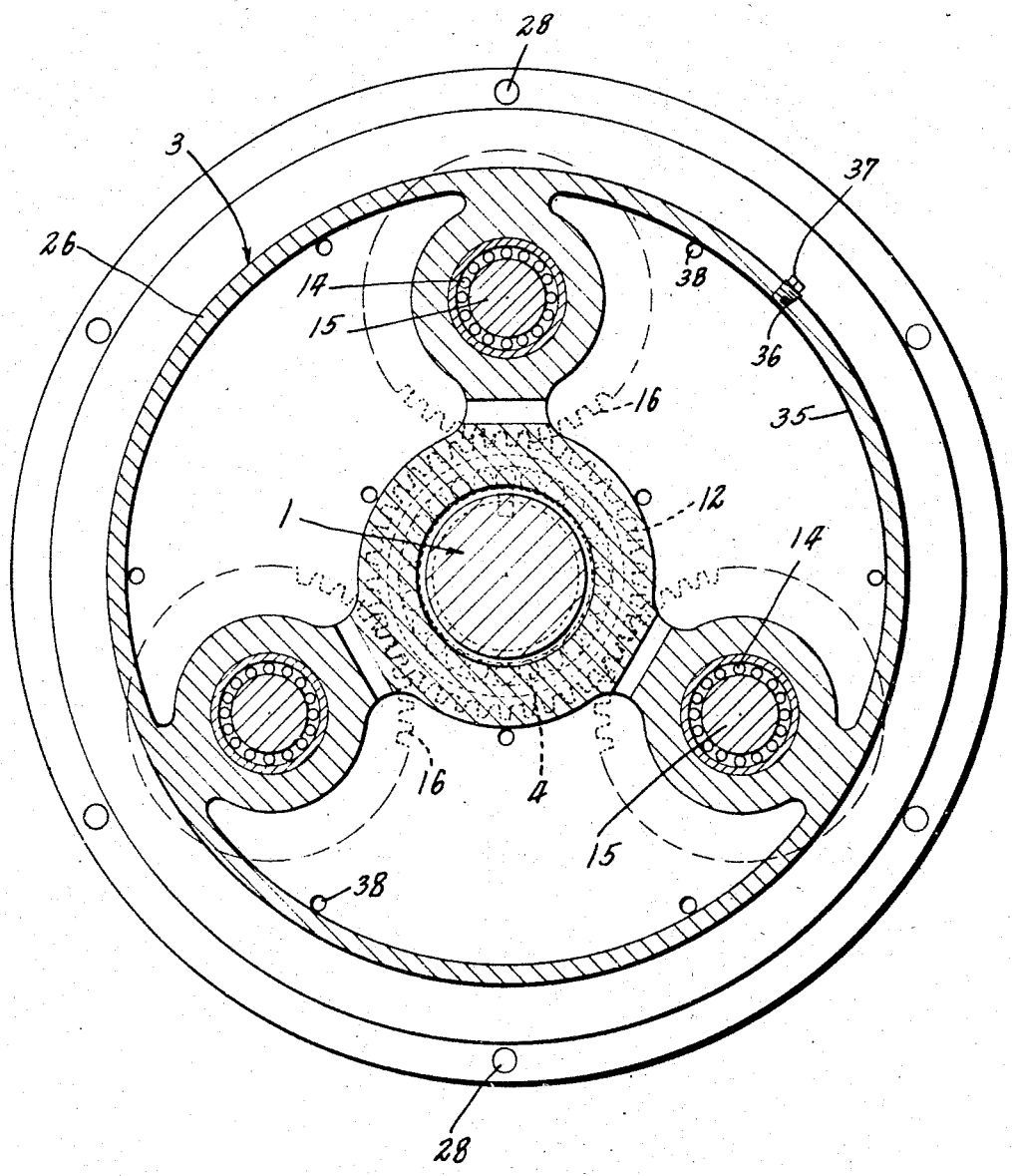
Figure 2 is a sectional end elevation taken substantially on the line 2—2 of Figure 1.

In the preferred embodiment of my invention as illustrated in the accompanying drawings, I indicates a driving shaft which may be driven from any suitable driving source not shown. A driven shaft 2 is mounted in alignment therewith, the said shafts being supported at their outer ends by suitable bearings (not shown). The spider 3 is rotatably supported on the driving shaft 1 by suitable bearings 4 and 5. The spider 3 is formed with an elongated hub 6 upon which there is pressed and keyed a connecting member 7. The connecting member 7 is splined as indicated at 8 to an adapter 9. The adapter 9 is keyed or otherwise suitably secured to the driven shaft 2. A pilot bearing 10 of the self-aligning type is provided between the end of the driving shaft 1 and the end of the adapter 9. The spline connection 11 between the adapter 9 and the shaft 2 is in radial alignment with the pilot bearing 10 so that the center of the spline connection lies in the central plane of this self-aligning bearing.

Secured on the driving shaft 1 and keyed thereto is a driving gear 12. Rotatably supported in the spider 3 on bearings 13, 14 are shafts 15 which carry planetary gears 16 and 17 at their opposed ends. The planetary gears 16 are in constant mesh with the driving gear 12 and the planetary gears 17 are in constant mesh with the driven gear 18. The driven gear 18 is rotatably supported on bearings 19 mounted on the hub portion 6 of the spider 3. The number of planetary gears or pinions 16 and 17 utilized may be varied to suit the particular design. The relative sizes of the planetary gears or pinions 16 and 17 is variable in accordance with the desired characteristics of the transmission drive as will hereinafter be set forth.

The gear 18 has an extended hub 20, and an annular flange 21 to which a brake rim 22 is bolted as by means of studs 23. The gear 18 and rim 22 are held in place relative to the spider 3 by means of a locking collar 24.

There is also provided a neutral brake 25 mounted on the member 7. It will, however, be obvious that the position and design of this neutral brake may be varied to suit the design of the transmission, the principal requirement of such neutral brake being that it be non-rotatably secured to the spider 3.

There is formed on the spider 3 an annular enclosing rim 26 which encloses the gears or pinions 16 and also provides a driving connection with the clutch rim 27. The clutch rim 27 is secured to the rim 26 through the medium of suitable securing members 28. The clutch rim 27 is provided with an enclosing flange 29 completing the enclosure for the gears 12 and 16 and an oil seal 30 is provided between the flange 29 and the hub of the gear 12, thus providing an oil seal partition between the gears and the clutch mechanism. It will be observed that the oil seal 30 is of small diameter, thereby permitting the use of commercial oil sealing rings.

A cover member 31 is likewise suitably secured to the spider 3 and cooperating with the oil seals 32, 33 and 34 completes the oil closure for the transmission gear mechanism. Said oil seals 32, 33 and 34 are likewise of small diameter, avoiding the necessity and construction of special sealing rings.

In order to provide for lubrication, the spider 3 is cored, as indicated at 35, and an oil opening is formed as indicated at 36 to permit the introduction of lubricant into the interior of the closed structure.

A plug 37 is provided which normally closes this hole. The lubricant introduced into the interior of the enclosure is circulated to the gears 12 and 16 through ports 38 and to the gears 17 and 18 through the openings 39. Lubricant flows to the bearings 19 through a port 40 formed through the hub 20 of the gear 18. Lubricant flowing into the enclosure adjacent the gear 12 flows along the shaft 1 to lubricate the bearings 4, 5 and 10.

The clutch utilized for releasably connecting the spider 3 directly to the driving shaft 1 may be of any suitable or desirable construction of standard design. It is here illustrated as being a multiple plate clutch. As illustrated, the clutch includes the clutch rim 27 having on its inner face the gear teeth 41. The outer clutch plates 42 are provided with teeth which mesh with the said teeth 41. A clutch plate carrier 43 is secured to the driving shaft 1. The carrier 43 has external teeth 44 meshing with the corresponding teeth on the clamping plate 42ᵃ and the center clutch plate 42ᵇ. The clamping plate 42ᵃ is adapted to exert pressure on the clutch plates against an abutment plate 45 provided on the clutch plate carrier 43. Axial adjustment of the clamping plate 42ᵃ is accomplished by the adjusting lock ring 46.

The clutch actuating means includes a clutch actuating collar, thrust collar 48 with the interposed link, and roller actuating mechanism 49. The clutch and brake mechanisms may be provided with any suitable form of actuating mechanisms and may be adapted to operate independently and selectively as is well understood in the art.

As heretofore set forth, the relative sizes of the gears or pinions 16 and 17 and their corresponding gears 12 and 18 are determinative of the operating characteristics of the transmission as disclosed. Thus as illustrated, the transmission provides for a forward and reverse drive connection between the driving shaft 1 and the driven shaft 2. This is because the pinions 16 are indicated as being of a diameter greater than the diameter of the pinions 17. If, however, the gear train is reversed, that is, so that the gears 17 are greater in diameter than the gears 16, the transmission will provide a reduction gear mechanism whereby the driven shaft 2 is driven in the same direction as the driving shaft 1 through said gears, but at a reduced speed. Thus the relative sizes of the gears 16 and 17 determine the direction of rotation of the planet mechanism. It will therefore be apparent also that if the gears or pinions 16 and 17 are of the same size, no differential movement will result.

The operation of the transmission embodying my invention is as follows: When it is desired that the shafts 1 and 2 be coupled for forward drive, the braking members 50 and 25 are released. The clutch collar 47 is actuated to force the clutch plates 42 together and against the abutment plate 45, whereby the drive from the driving shaft 1 is made through the clutch plates 42, clutch rim 27, spider 3, connector 7, through the splines 8, adapted 9 to the shaft 2, thus eliminating any driving torque being transmitted through the gear mechanism.

When it is desired to drive through the transmission gears as in the example illustrated to provide a reverse drive, or to drive the shaft 2 counter to the shaft 1, the clutch is released and the neutral brake 25 is actuated to released position and the reversing brake 50 is clamped to the rim 22, holding the gear 18 stationary. The drive is then made through the gears 12, 16, 17 and 18. The gears 17 at this time turn relative to the gear 18 and cause the spider 3 to planet around the gear 18 in a direction counter to the rotating shaft 1. Thus the spider 3, connector 7, adapted 9 and shaft 2 are reversed.

When it is desired to hold the shaft 2 stationary, the neutral brake 25 is employed. As heretofore set forth, by variation of the relative sizes of the gears 16 and 17 and their meshing gears 12 and 18, the gear reduction of the reverse speed drive to the shaft 2 may be varied as also may be the direction of drive. Thus by changing the gear sizes 16 and 17 so that the gear 17 is greater than the gear 16, the direction of planeting movement of the spider 3 is reversed from that illustrated so that the shafts 2 may be driven in a forward direction at a reduced speed, thus providing a gear reduction.

While the foregoing discussion has referred to the "shaft 1" as the driving shaft and the "shaft 2" as the driven shaft for purposes of explanation, it will nevertheless be apparent that the functions of these shafts can be readily interchanged. Thus, the shaft 2 could operate as the driving shaft and the shaft 1 as the driven shaft.

Having fully described my invention, it is to be understood that I do not wish to be limited to the details herein set forth, but my invention is of the full scope of the appended claims.

I claim:

1. In a transmission, the combination of a shaft having a gear fixed thereon, bearing means on said shaft at one side of said gear, a spider rotatably supported on said bearing means, an external spur gear rotatably mounted axially of said spider, gear means carried by the spider operatively connecting said fixed gear and said external spur gear, releasable means selectively operable to hold said external spur gear stationary, whereby the spider and shaft are caused to have relative rotation therebetween, and releasable clutch means adapted to place the spider in direct driving relation with said shaft whereby the shaft and spider rotate at the same speed.

2. In a reversing mechanism, the combination of a driving shaft having a driving gear thereon, bearing means on said shaft at one side of said gear, a spider rotatably supported on said bearing means, releasable clutch means adapted to place the spider in direct driving relation with said shaft, a loose gear rotatably mounted axially of said spider, gear means carried by said spider including a large gear meshing with said driving gear and a small gear meshing with said loose gear, the said large and small gears being non-rotatably connected so that they rotate as a unit, and releasable means selectively operable to maintain said loose gear stationary, whereby the spider is caused to rotate in a direction counter to that of the driving shaft.

3. In a reversing mechanism, the combination of aligned driving and driven shafts, gearing connecting said shafts for reverse drive including a gear wheel fixed to the driving shaft, a spider rotatably mounted on the driving shaft, planet gears carried by the spider and meshing with the said gear wheel, complementary planet gear wheels secured relative to said planet gears, a gear wheel loose on the spider and in mesh with said complementary planet gear wheels, the driven shaft being drivably connected to the spider, a brake to hold said loose gear wheel stationary to set said gearing for reverse drive, and clutch mechanism to connect said spider and said driving shaft in direct driving relation whereby said shafts may be connected for forward drive independent of said gearing.

4. In a reversing mechanism, the combination of a driving shaft having a driving gear thereon, a spider rotatably mounted on the driving shaft, a friction clutch adapted to releasably connect the spider directly to the driving shaft to provide a forward drive, a loose gear rotatably supported upon said spider, a plurality of parallel stub-shafts each rotatably mounted on said spider, each stub-shaft having a large gear and a small gear fixed thereon, each of said large gears meshing with the driving gear and each of said small gears meshing with said loose gear, and releasable means selectively operable to hold said loose gear stationary, whereby the spider is caused to rotate in a direction counter to that of the driving shaft.

5. In a reversing mechanism, the combination of driving and driven shafts disposed in axial alignment, a spider mounted for rotation about the axis of said shafts, connecting means whereby the spider is non-rotatably associated with said driven shaft, releasable clutch means adapted to operatively connect the spider and the driving shaft and thereby rotate the driven shaft in a forward direction, a driving gear fixed with respect to the driving shaft, bearing means carried on said spider coaxially of said shaft, a loose gear rotatably supported on said bearing means, gear means carried by said spider including a large gear meshing with said driving gear and a small gear meshing with said loose gear, the said large and small gears being non-rotatably connected so that they rotate as a unit, and releasable means selectively operable to maintain said loose gear stationary, whereby the spider and the driven shaft are caused to rotate in a reverse direction.

6. In a transmission, the combination of a first shaft having a gear thereon, spaced bearings on said first shaft at one side of said gear, a spider mounted upon said bearings, a loose gear rotatably mounted upon said spider, gear means carried by the spider operatively connecting said gear on the first shaft and said loose gear on the spider, a second shaft in axial alignment with said first shaft, a pilot bearing operatively connecting the adjacent ends of said shafts, means connecting the spider to rotate with said second shaft, and releasable means selectively operable to hold said loose gear stationary whereby the first and second shafts are caused to have relative rotation.

7. In a transmission, the combination of aligned driving and driven shafts, a spider rotatably mounted axially of said shafts and connected to drive the driven shaft, said spider having a housing forming an enclosure therein, gearing within said enclosure adapted to provide a releasable transmission connection between said shafts whereby the driven shaft may be rotated at one speed, releasable clutch means positioned exteriorly of said enclosure and adapted to connect said spider directly with said driving shaft whereby the driven shaft may be rotated at another speed.

8. In a transmission, the combination of a driving shaft having a driving gear thereon, axially spaced bearings on said shaft at one side of said driving gear, a spider mounted for rotation upon said axially spaced bearings, releasable clutch means adapted to place the spider in direct driving relation with the driving shaft, a loose gear rotatably mounted axially of said spider, gear means carried by said spider including a small gear and a large gear meshing respectively with said loosely mounted gear and said driving gear, the small and large gears being non-rotatably connected so that they rotate as a unit, and releasable means selectively operable to maintain said loose gear stationary.

9. In a reversing mechanism, the combination of a shaft having a gear fixed thereon, bearing means carried on the shaft on one side of the gear, a spider mounted upon said bearing means, a clutch on said shaft on the other side of said gear and adapted to releasably connect said spider to said shaft, a loose gear rotatably mounted axially of said spider, gear means carried by said spider including a large gear meshing with said fixed gear and a small gear meshing with said loose gear, the said large and small gears being non-rotatably connected so that they rotate as a unit, and releasable means selectively operable to maintain said loose gear stationary, whereby the spider and said shaft rotate in opposite directions.

10. In a transmission, the combination of a shaft having a gear member fixed thereon, a spider rotatably mounted on the shaft at one side of said gear member, a clutch for releasably connecting the spider directly to said shaft, said clutch including an element on shaft at the other side of said gear member, a loose gear member rotatably mounted axially of the shaft, a plurality of parallel stub-shafts each rotatably mounted on said spider, each stub-shaft having a large gear and a small gear fixed thereon, each of said large gears meshing with one of said gear members and each of said small gears meshing with the other of said gear members, and releasable means selectively operable to hold said loose gear stationary whereby the spider and the shaft are caused to have relative rotation.

11. In a transmission, the combination of aligned driving and driven shafts, a spider rotatably mounted axially of said shafts and connected to one of said shafts, said spider having a housing forming an enclosure therein, gearing within said enclosure adapted to provide a transmission connection between said shafts, releasable means to render said gearing operable whereby said shafts are caused to have relative rotation, and releasable clutch means positioned exteriorly of said enclosure and adapted to place the spider in direct driving relation with the other of said shafts whereby both shafts rotate at the same speed.

12. In a transmission, the combination of aligned driving and driven shafts, axially spaced bearings on the first of said shafts, a spider rotatably supported on said axially spaced bearings and connected to rotate with the other shaft, gear means including a pair of planet gears rotatably carried by said spider and adapted to rotate as a unit, releasable means to render said gear means operable to effect a driving connection between the first shaft and the spider whereby the shafts may have relative rotation, and releasable clutch means adapted to effect a second driving connection between the first shaft and the spider independently of the gear means, whereby the shafts may rotate at the same speed.

13. In a transmission, the combination of aligned driving and driven shafts, a spider rotatably mounted on the first of said shafts and connected to rotate with the other shaft, said spider having a housing defining an enclosure therein, a loose gear rotatably mounted axially of the spider, a fixed gear secured on said first shaft, gear means carried by the spider within the enclosure operatively connecting said loose gear and said fixed gear, said gear means including a plurality of stub shafts each rotatably mounted on said spider and provided with a planet gear at either end, one of the planet gears meshing with the loose gear and the other meshing with said fixed gear, releasable means selectively operable to hold said loose gear stationary whereby the shafts may have relative rotation, and releasable clutch means positioned at one side of the spider exteriorly of said enclosure and adapted to directly connect the spider and the first shaft, whereby the shafts may rotate at the same speed.

JOHN S. MORGAN, Jr.